United States Patent [19]
Long et al.

[11] Patent Number: 4,860,096
[45] Date of Patent: Aug. 22, 1989

[54] MOTION ANALYSIS TOOL AND METHOD THEREFOR

[75] Inventors: Eugene C. Long, Lafayette; James E. Kubitschek, Westminster; Stephen M. Horacek, Boulder, all of Colo.

[73] Assignee: Ball Corporation, Muncie, Ind.

[21] Appl. No.: 222,401

[22] Filed: Jul. 21, 1988

[51] Int. Cl.⁴ ............................................. H04N 7/18
[52] U.S. Cl. .................................... 358/101; 358/105
[58] Field of Search ................ 358/93, 101, 105, 106, 358/107, 254

[56] References Cited

U.S. PATENT DOCUMENTS

| | | | |
|---|---|---|---|
| 3,275,744 | 9/1966 | Dietrich | 358/93 |
| 3,390,229 | 6/1968 | Williams | 358/107 |
| 3,543,087 | 11/1970 | Saiger et al. | 315/208 |
| 4,147,977 | 4/1979 | Dimmick | 324/121 |
| 4,339,775 | 7/1982 | Lemke | 358/213.31 |
| 4,413,277 | 11/1983 | Murray | 358/101 |
| 4,487,075 | 12/1984 | Karidis | 73/861.05 |
| 4,511,931 | 4/1985 | Bixby | 360/10.3 |
| 4,653,109 | 3/1987 | Lemelson | 358/105 |
| 4,719,513 | 1/1988 | Peterson | 358/254 |
| 4,755,881 | 7/1988 | Bartlett | 358/254 |
| 4,789,894 | 12/1988 | Cooper | 358/105 |

OTHER PUBLICATIONS

VLC-660, VLC-360, InStar, ColorStar 300, LS-900, InStar C660 & Portable Instar—Video Logic, Sunnyvale, Calif. 94086.
MVS 2020/2200 Series—EG&G Electro-Optics, Salem, Mass. 01970.
CMOS 8-Bit Monolithic A/D Flash Converter—Micro Power Systems, Santa Clar, Calif. 95054.
SAB 80515/SAB 80535 8-Bit Single-Chip Microcontroller-Siemens AG, Bereich Bauelemente Balanstrabe 73, Postfach 801709.
Bt106—Brooktree Corporation, San Diego, Calif. 92121.
Motion Control Systems, Robotics-Measurements & Control—Oct., 1986.
High-Speed Motion Analysis Examining a Slice of Time by John J. Foley, Eastman Kodak Company, San Diego, Calif.
Steel Takes a Hard Look at Surface Inspection—an Abridged Verison of an Article Appearing in Iron Age Magazine.
New Motion Analyzer Cuts Design and Production Costs . . . Increases Productivity—Instrumentation Marketing Corp., Burbank, Calif. 91506.
Kodak EktaPro 1000 Motion Analyzer—Eastman Kodak Company, San Diego, Calif. 92121.
HSV Motion Analyzer—Instrumentation Marketing Corp., Burbank, Calif. 91506.
High Speed Photo/Video Systems for Industry and Government—Instrumentation Marketing Corp., Burbank, Calif. 91506.
Unilux An American Answer to Quality Control, Unilux, Inc., Hackensack, N.J. 07601.

*Primary Examiner*—Howard W. Britton
*Attorney, Agent, or Firm*—Dorr, Carson, Sloan & Peterson

[57] ABSTRACT

A motion analysis tool for viewing the repetitive motion of an object having a video camera for producing images of the object as it moves, a strobe directed at the object for illuminating the object while the image is taken, a controller for capturing a series of video images over a number of cycles of the object wherein only one image is captured in a cycle and each successive image is advanced a predetermined step of time in successive cycle so that when the series of images is displayed a slow motion view of the object is provided while the object moves in the repetitive motion. The analysis tool provides a viewing window wherein the full cycle or only a selected portion of the cycle can be repeatedly viewed. The predetermined steps of time can be varied to increase the resolution.

28 Claims, 9 Drawing Sheets

MOTION ANALYSIS TOOL AND METHOD THEREFOR

BACKGROUND OF THE IMPLEMENTATION

1. Field of the Invention

The present invention relates to video systems for motion analysis and, in particular, to a video sampling motion analysis tool for real time motion analysis of repetitive or cyclic mechanical systems.

2. Statement of the Problem

Many manufacturing processes utilize mechanical equipment that undergoes cyclic or repetitive motion. When such high speed mechanical equipment does not operate properly or according to specification, the problem is often difficult to diagnose because the equipment is moving too fast. In addition to the movement of mechanical equipment, high speed repetitive motion may also occur in the movement of objects such as occurs with the movement of objects on a conveyor line. A need exists to provide a system that provides slow motion visual images of the high speed cyclic or repetitive objects while they are in operation to properly diagnose any mechanical problem or to view the repetitive motion of objects in general.

A number of commercial motion analyzers are available that aid in the diagnosis of such high speed equipment. In the article "High Speed Motion Analysis" by John J. Foley, Machine Design, March 10, 1988, Pages 117–121, a survey of current motion analysis techniques are set forth. One conventional approach to motion analysis is the use of video recording devices. These video systems utilize a recording camera, a strobe light to clearly capture the movement, and playback equipment which is used to playback the recorded high speed operation of the mechanical device at a much slower speed for diagnostic analysis. Such conventional high speed video approaches for motion analysis rely on taking a high speed recording of the entire mechanical operation and then using complex electronic circuitry to play the recording back at a much slower speed at a later time. One example of such conventional approaches is the Kodak EKtaPro 100 Motion Analyzer which captures up to 1000 full frames per second (up to 60000 pictures per minute) and provides instant replay with slow motion and stop action without blur. Another example is the UNILUX System 850 which can shoot video tape at speeds up to 600 frames per second. These conventional systems provide footage of the motion for later viewing. A need exists for a motion analyzer that permits real time evaluation of mechanical motion while the object is moving.

Such conventional motion analysis approaches generally require that the observed motion be sampled many times per cycle or event. Thus, these machines must have very fast sampling rates and they are not compatible with present video recorders.

Finally, such conventional motion recording systems are often expensive and utilize equipment that not only is bulky but difficult to set up and take down. The cameras and playback equipment to provide the slow motion playback are specially designed. As pointed out by Foley, above at page 119, such systems may cost between $60,000 to $120,000.

A need exists for a motion analysis tool which is not bulky, is easy to set up and take down, is less expensive, and which utilizes conventional video equipment. Furthermore, this equipment could be on line, capture images in real time, permit the user to view all or a portion of the repetitive cycle, and allow cycle-to-cycle comparison of the viewed portion.

3. Solution to the Problem

The motion analysis tool and method of the present invention is a real time video sampling machine that is capable of viewing all or any portion of repetitive or cyclic motion. By using a sampling technique (i.e., grabbing a video image of the motion in successive repetitions), the present invention simulates a complete or a portion of a cycle by taking one sample per cycle at various stages of the actual mechanical motion. This sampling technique allows a real time slow motion simulation of the mechanical operation to be viewed by the operator.

The analysis tool of the present invention operates in two basic modes. In the first mode of operation, the system is externally triggered by the operation of the mechanical device to be in synchronization with the motion of the mechanical device. A viewing window can then be established for either the full cycle of operation of the device or the window can be narrowed down to view only a desired portion of the cycle. The viewing window can be adjusted to be at any motion position within the cycle.

In the second mode of operation, the present invention is internally triggered and, therefore, operates asynchronously from the operation of the mechanical device. However, the user can adjust the frequency of the internal trigger to closely match the rate of the mechanical device. This allows the operator to freeze the sampling at any point in the machine cycle or to use the viewing window to view all or a selected portion of the cycle.

The user interface of the current implementation consists of a combined display and an operator interface. The operator interface is used by the operator to set up the analysis tool of the present invention and the display is used to view the slow motion images produced by the system.

The present invention utilizes a low cost CCD video camera (color or monochrome) and fiber optic strobe head mounted onto mechanical fixtures that can be attached to standard camera tripods or extensions. The compact system of the present invention can be easily packed into a case for airline travel and can be quickly set up or taken down at a desired location.

4. Search

A search was performed on the present invention and the results of the search uncovered the following patents:

| Inventor | Reg. No. | Issued |
| --- | --- | --- |
| Dietrich | 3,275,744 | 9-27-66 |
| Williams | 3,390,229 | 6-25-68 |
| Saiger | 3,543,087 | 11-24-70 |
| Dimmick | 4,147,977 | 4-3-79 |
| Karidis | 4,487,075 | 12-11-84 |
| Bixby | 4,511,931 | 4-16-85 |

Bixby discloses a conventional high speed video approach for motion analysis which relies on the slow motion playback of a recording. The Dietrich patent sets forth a vidicon camera in combination with a synchronized strobe scope for the analysis of spray coming from a nozzle. Saiger sets forth a lamp flashing circuit for a gas-filled flash tube which functions as a stroboscopic light source for viewing rapidly moving machinery. The Karidis patent makes use of a strobe light to illuminate injected gas bubbles in a liquid flow stream as a means for observing liquid flow conditions. Williams utilizes a strobe flash and camera for spray particle analysis. Finally, Dimmick utilizes a light source and oscilloscope to view rapidly moving objects over small relative distances such as the movements of relays.

None of the above references set forth either the structure or the method of the present invention pertaining to the progressive real time sampling of the motion as summarized in the next section.

SUMMARY OF THE INVENTION

The motion analysis tool of the present invention is capable of viewing the repetitive motion of an object. Such repetitive motion includes both non-cyclic and cyclic repetitive motion. In a first mode of operation, an external synchronous signal is fed to the motion analysis tool of the present invention to generate a trigger signal corresponding to each repetition of the object. In a second mode of operation, the motion analysis tool generates an internal trigger signal which can be adjusted to match the frequency of the repetition of the object.

A video camera is directed at the object and produces one video image of the object as the object moves through each repetition. A portable strobe head is also directed at the object for selectively illuminating the object. A controller receives the trigger signals and a frame grabber captures the video image from the camera. The controller selectively illuminates the object with the strobe at different times in subsequent repetitive cycles and the frame grabber captures each subsequent video image. The frame grabber of the present invention captures only one video image from each successive repetition of a cycle. Each successive captured image is advanced a predetermined step of time so that when the series of captured images is displayed, a slow motion simulation of the object is provided. This series of pictures can be viewed simultaneously with the motion.

An operator interface is connected to the controller which enables the operator of the present invention to set the start and end of a viewing window based on the trigger signal. The viewing window can be adjusted to encompass the entire cycle or it can be adjusted to start a predetermined delay from the trigger signal and end at a second predetermined delay from the trigger signal. The viewing window can, therefore, be any duration from only a small portion of the cycle to the entire cycle and can be located at any position within the movement of the object. The operator interface also has an input to enable the operator to vary the time steps between displaying successive images and an input enabling the controller to skip a set number of repetitions before the next successive image is captured. This latter input is designed for extreme high speed motion analysis.

The method of the present invention includes the steps of generating a trigger signal corresponding to each repetition of motion of the object, capturing a series of video images of the object wherein each captured image in the series is spaced a predetermined step of time apart in the repetitive movement and wherein each successive captured image in the series is taken from the next or a subsequent successive repetition of the object. Each captured image is then displayed until the next image is taken. This results in a slow motion simulation view of the object as the object or objects move in repetitive motion.

The resulting video is in a standard video format, thus it can be viewed in real time and/or recorded on a conventional video cassette recorder (VCR) for playback at a later date.

DETAILED DESCRIPTION

1. General Discussion of System Components

Figure 1:
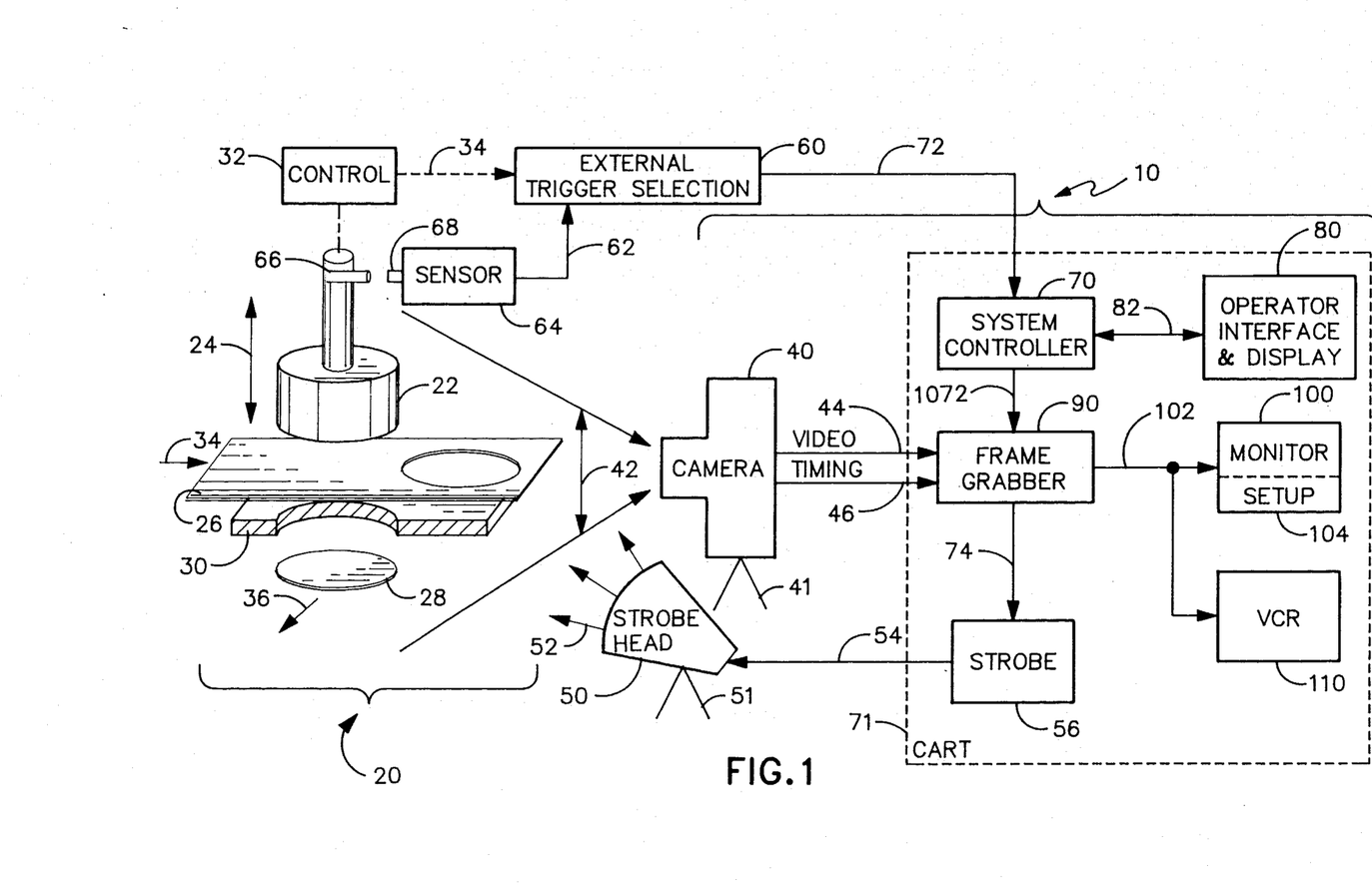
FIG. 1 sets forth a block diagram illustration of the major components of the motion analysis tool of the present invention.

In FIG. 1, the motion analysis tool 10 of the present invention is shown in operation with repetitive or cyclic object motion such as that produced by a piece of manufacturing equipment 20. The equipment 20, in FIG. 1, is shown for purposes of illustration only and can comprise any high speed or low speed repetitive or cyclic object.

Cyclic motion is that motion wherein the object being observed repeats in a recurring period of time and in the same sequence. An example of cyclic mechanical motion is shown in FIG. 1 where a punch 22 reciprocates in the direction of arrow 24 to stamp out a beverage container lid 28 in material 26. Underneath the material is a die 30. An electronic or mechanical control 32 controls the punch 22, the feed of the material 26 in the direction of arrow 34 and the delivery of the cut lid 28 in the direction of arrow 36. The stamping process repeats in the same sequence in a recurring period of time.

Repetitive motion is that motion which occurs over and over and may or may not include the same object. Cyclic motion is repetitive, but not all repetitive motion is cyclic. For example, in a conveyor carrying a line of spaced objects such as aluminum beverage cans, the passage of the different objects past a point is repetitive but not cyclic.

The external trigger selection 60 depending upon the nature of the equipment may receive a signal over line 62 from a sensor 64 which detects the cyclic or repetitive motion of the object or piece of equipment 20. In such a case, a magnetic device 66 may be physically attached to the moving punch 22 to provide a position indication 68, as shown in FIG. 1. As the punch 22 moves in the directions of arrow 24, the sensor detects the presence or absence of the magnetic device at position 68. An appropriate trigger signal is then delivered from the sensor 64 over line 62 to the external trigger selection 60 when device 66 is at position 68. For some pieces of equipment 20, the equipment's conventional control 32 may already generate a cyclic signal which can be delivered over lines 34 to the external trigger selection 60. In that event, a separate sensor 64 and device 66 are not required. The circuit 60, therefore, functions to deliver an external trigger signal on line 72 for each cyclic or repetitive motion of the object. The external trigger selection 60 is accomplished by wiring the appropriate trigger source (i.e., from sensor 68 or control 32) to the external trigger input 72.

Hence, under the teachings of the present invention, a trigger signal can either be obtained from the equipment's control circuitry 32 or can be suitably generated such as through use of a sensing device 68 and a signal generator 66. Other suitable means for detecting the cyclic nature of the piece of equipment 20 could be used such as optical detectors and the like.

The motion analysis tool system 10 of the present invention uses a standard RS170 CCD video camera 40, a strobe head 50, a st-robe 56, the external trigger input 72, a system controller 70, a frame grabber 90, an operator interface and display 80, a video monitor 100 such as a 12" Monochrome RS-170 monitor, and an optional video cassette recorder (VCR) 110 such as a ½ inch VHS format VCR. The VCR 110 is used for subsequent playback of the motion if desired.

The strobe head 50 and strobe 56 provide a pulsed sequence of light 52 onto the piece of equipment 20. In FIG. 1, the head 50 is separate from the strobe 56 and a fiber optic cable 54 connects the two components together. The head 50 could also be mounted on the strobe 56 as a single integrated unit. It is to be understood that other lighting devices such as DC light could also be used with a shuttered camera. The strobe 56 is activated by signals on line 74 from the frame grabber 90. The use of strobe lighting 52 creates an effective shutter speed, in the preferred implementation, of approximately 30 microseconds which minimizes image smear for very fast motion. The teachings of the present invention, however, are not necessarily limited to 30 microseconds.

The camera 40 has a field of view 42 which receives an image of the piece of equipment 20 and delivers that image over lines 44 to the frame grabber 90. Timing signals from the camera 40 are also delivered over lines 46 to the frame grabber 90. The controller 70 is activated by a human operator through use of the operator interface 80 which delivers command signals over lines 82 to the controller 70. The controller 70 provides setup information back to a display in the interface 80 which is used by the operator.

The image of the piece of equipment 20 at a point in time in its motion is displayed in video monitor 100 which is delivered over lines 102 from the frame grabber 90. It is to be expressly understood that the video monitor 100 which displays the image of the piece of equipment 20 may also be configured to display the setup information 104. In this event, the display in the interface 80 could be optional with the system. Finally, a conventional VCR 110 connected to the frame grabber 90 can be optionally utilized to store the series of images for later playback.

The camera 40 and the strobe head 50 are mounted on conventional tripods 41 and 51 at any convenient position around the object 20 to provide an illuminated view of the motion. The camera 40 is connected to the frame grabber 90 with lengthy cables 44 and 46. As mentioned the strobe head 52 may also be connected to the strobe 56 with a long fiber optic cable 54 The remaining system components (i.e., the controller 70, interface 80, strobe 56, frame grabber 90, monitor 100, and the VCR 110) can be placed on a moveable cart 71. The present invention is highly portable and can be easily moved and set up to view different objects at different locations.

2. General Discussion of System Operation

Figure 2:
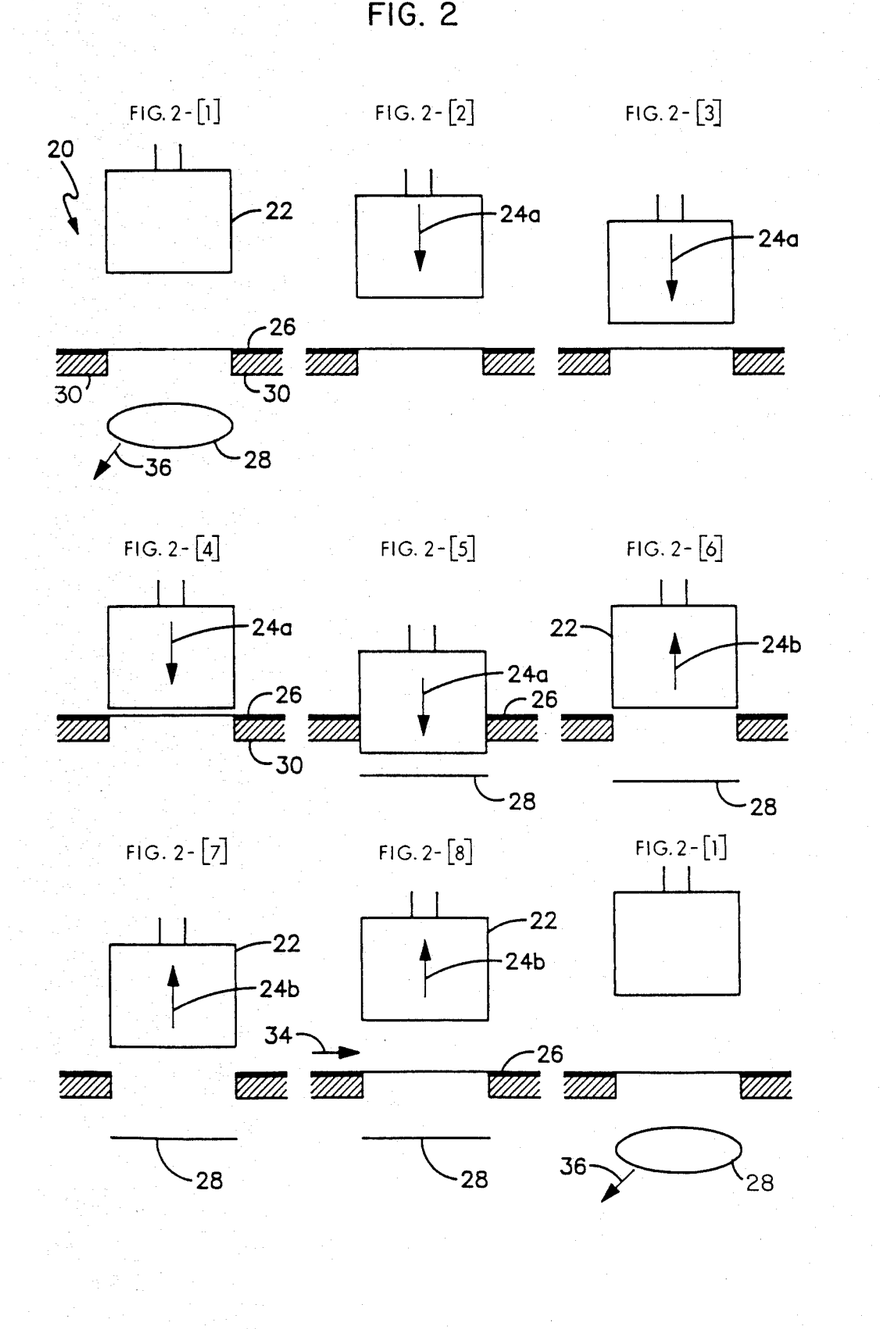
FIG. 2 sets forth an illustration showing the cyclic motion of a conventional mechanical punch press.
Figure 3:
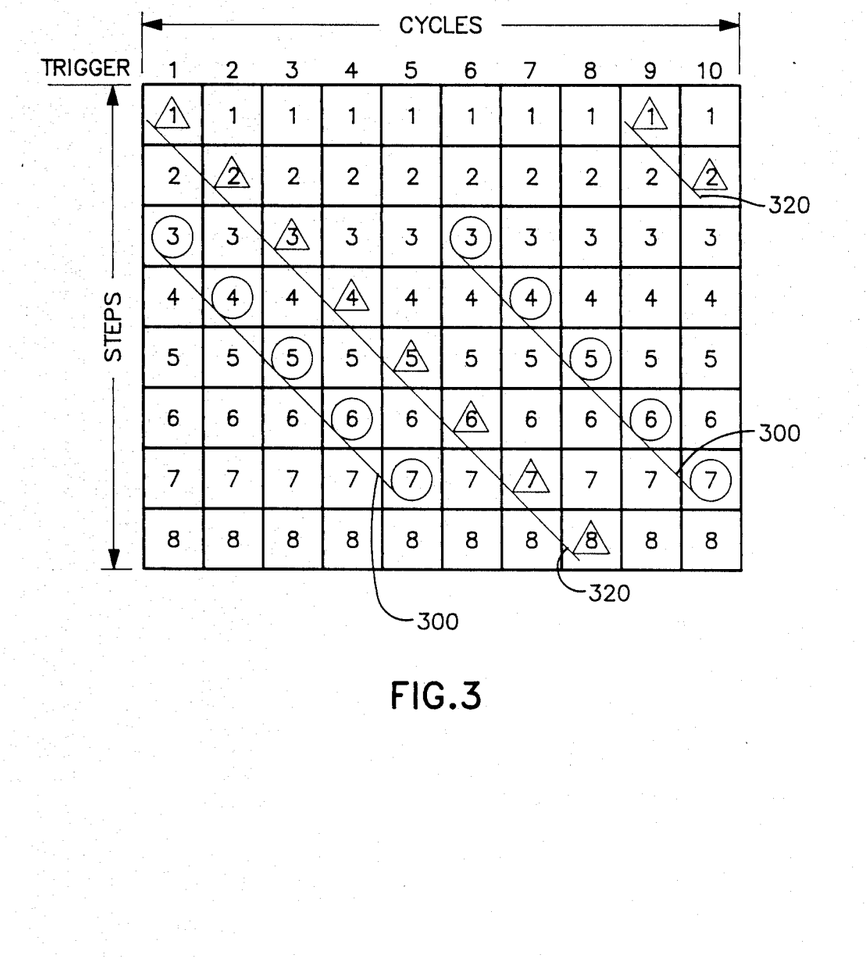
FIG. 3 sets forth a diagram showing progressive cycles of the cyclic operation of the punch press of FIG. 2 illustrating only eight steps in the cycle.

The operation of the motion analysis tool system 10 of the present invention as shown in FIG. 1 will now be analyzed with respect to FIGS. 2 and 3.

In FIG. 2, the equipment 20 that performs the repetitive cyclic function of punching out beverage can lids 28 is shown during eight equally spaced time steps of one full cycle. This is purely an illustration to aid in the discussion of the present invention. In step 1, the motion shows the punch 22 at the top end of its cycle having completed the punching of a lid 28 which, as shown, is being delivered away from the equipment 20 as indicated by arrow 36. In step 2, the punch 22 is moving in a downwardly direction 24a. In step 3, the punch moves further downwardly in the direction of 24a until at step 4 it commences to engage the material 26 which is supported on die 30. In step 5, the punch separates the lid 28 from the material 26 and in step 6, the punch 22 moves upwardly in the direction of arrow 24b. In steps 7 and 8, the punch 22 continues to move upwardly in the direction of arrow 24b until the cycle is repeated all over again in step 1. In step 8, the material 26 is moved in the direction of arrow 34 so that a new lid can be punched out.

The machine steps, as shown in FIG. 2, are set forth as an example only. It is to be expressly understood that while only eight time steps are shown in the cycle, any desirable number of steps such as 100, 256 or 400 equally spaced time steps could be utilized to represent the stages of motion of the equipment 20 through a cycle or a repetition. It is also to be expressly understood that the present invention is not limited to the imaging of this type of equipment but is applicable to all repetitive or cyclic mechanical motion or object motion.

In FIG. 3, a matrix of ten successive repetitions of the punch (in this case cycles 1 through 10) with respect to the eight illustrated steps of FIG. 2 are shown. If a video image of each motion step of FIG. 2 for each of the cycles through 10 were taken, then FIG. 3 would comprise a matrix of real time video images illustrating the operation of the piece of equipment. The present invention does not produce such a matrix of images as that produced by a conventional slow motion system discussed in the Statement of the Problem section which would take footage (such as Cycle 1, steps 1 through 8) of the motion and then play back the footage at a very slow rate. The present invention operates in an entirely different fashion as follows.

For purposes of the following examples, only the eight illustrated steps are shown in FIG. 2 which, it is to be understood, represents too few steps in a practical analysis. As a first example let's follow the capturing sequence of images indicated as 320 in FIG. 3 representing the viewing of a full cycle. Triangle 1 at the upper left corner indicates the first image captured of a sequence. Notice that only one image is taken during cycle 1 or any other cycle. The image indicated by triangle 2 is one step in time later than triangle one but taken during cycle 2. Thus the sequence continues until, in this example, eight images have been captured with each image being captured in the next successive cycle and one time step later. The operator views the image of triangle 1 in monitor 100 until the image of triangle 2 is captured at which time the operator views the image of triangle 2 (i.e., step 2 of FIG. 2). The process repeats for the full cycle along line 320.

Assume that the operator wishes to view only the motion from steps 3 to 7 of the operation of the piece of equipment—that is a selected portion or a "viewing window" of the cycle. The present invention 10 functions to provide the "viewing window" as follows. In the first mode of operation (i.e., SYNC), the start of the cycle causes a TRIGGER signal to be delivered to the system 10 via the external trigger input 72. The operator then adjusts the START DELAY (PLUS or MINUS) so that the viewing of the motion commences at step 3. At step 3, the controller 70 activates the strobe 50 to illuminate the object 20, the camera 40 produces a video image, and the frame grabber 90 captures or grabs the image. The image at step 3 is shown in the monitor 100 and the value of the step is shown in display 80. If the operator desires to change the START setting, for example to start at step 2 rather than at step 3, START DELAY (MINUS) is adjusted until step 2 is shown in the monitor 100. Since the operator wants to stop viewing the image at step 7, he adjusts the END DELAY control until step 7 is viewed in the monitor 100 and the values of the END step are shown in the display in the interface 80.

The system, as will be more fully explained, can have a large number of motion steps defined within it. After setting the viewing window, the user adjusts the STEPS (PLUS or MINUS) control to set the number of steps between the START and the END frames of the viewing window. Adjusting STEPS to one creates one STEP and the frames viewed by the operator are: START, STEP1, and END where STEP1 is the frame at the midpoint in time between START and END. Adjusting STEPS to three creates three STEPS between START and END. For example for line 300 in FIG. 3 when START =3 and END =7, then the three equally spaced STEPS are 4, 5 and 6. The system of the present implementation of the invention divides the time between START and END by 3 to determine STEPS 4, 5 and 6. In the general case of n STEPS, the system calculates the differential time, $t_d$, between viewing steps as follows:

$$T_d = (T_{end} - T_{start})/n \qquad \text{Formula 1}$$

The present implementation of the invention is capable of operating to a resolution for $T_d$ of 100 microseconds.

In the above example of line 300, therefore, the operator only wishes to view the operation of the machine in a viewing window from step 3 through step 7 of each cycle and not to view the remainder of the cycle. Steps 3 through 7 define the viewing window and the motion in steps 3 through 7 is repeatedly displayed in monitor 100 (i.e., steps 3 to 7 of FIG. 2). The START DELAY determines the starting step for viewing and the END DELAY dictates the ending step for viewing both of which are controlled by the operator. The use of these two controls enables the operator to select any portion of any time position in the cycle for viewing of the motion. Hence, in the current example, the selected viewing window is a portion of the cycle comprising five steps (steps 3 through 7). However, the images being viewed are not from the same cycle or repetition. In FIG. 3, the image at circle 3 (corresponding to step 3, cycle 1) is illuminated by the strobe 50, taken by the camera 40, and captured by the frame grabber 90. The image at circle 4 (corresponding to step 4, cycle 2) is also captured. Likewise, the images at circles 5, 6 and 7 are all captured by the frame grabber 90. In cycle 6, the process is repeated. During the time interval from image to image, the most recently captured image is displayed on monitor 100.

The present invention is a motion analysis tool since each subsequent cycle (or repetition) has an image captured at the next step in the cycle (or repetition) as shown along line 300 by the encircled numbers. What is viewed in the video monitor 100 by the operator is a reconstructed machine cycle in the desired viewing window. The reconstructed images in the monitor 100 are viewed as if the machine were running very slow (in the example of line 300, a portion of one cycle is viewed over the time of five full cycles) while the object 20 undergoes its high speed motion.

As can be observed in FIG. 3, the operator only sees the motion in the viewing window continually repeated on the monitor. After capturing the image at circle 7 (cycle 5, step 7) the system continues by capturing the image at circle 3 motion (cycle 6, step 3). The images contained in steps 1, 2 and 8 are not viewed by the operator in this selected viewing window. The repetition of the viewing window allows the operator to make cycle to cycle comparisons of the machine's motion on line with the machine and in real time.

Clearly, a complete cycle can be viewed by properly setting the START and END DELAYS of the viewing window to correspond with the beginning and ending of the cycle or repetition as shown by line 320 in FIG. 3. Hence, the present invention provides diagnostic imaging on partial or complete cycles of the equipment 20.

The imaging viewed by the operator in video monitor 100 also occurs in "real time" which is contrary to the teachings of conventional systems which rely on recordings of playback analysis. In comparison with such conventional imaging systems, a complete cycle such as represented by cycle 1 of FIG. 3 is taken and then the conventional imaging system using complex and expensive equipment slows down the images captured during cycle 1 for display at a later time in a suitable monitor. The present invention captures images in real time for viewing in real time.

Furthermore, the present invention can selectively start and complete a portion of a cycle at any desired position of the equipment. This aids in the diagnosis of the moving equipment. The online viewing of the high speed equipment permits the operator to make changes to the equipment and to immediately view how such changes affect the motion of the equipment. Conventional high speed video systems do not permit such rapid feedback of information to the operator. The window of the present invention can, therefore, be as long as desired and in the step resolution as the operator desires. The window can be located to view the motion anywhere in the cycle.

Figure 4:
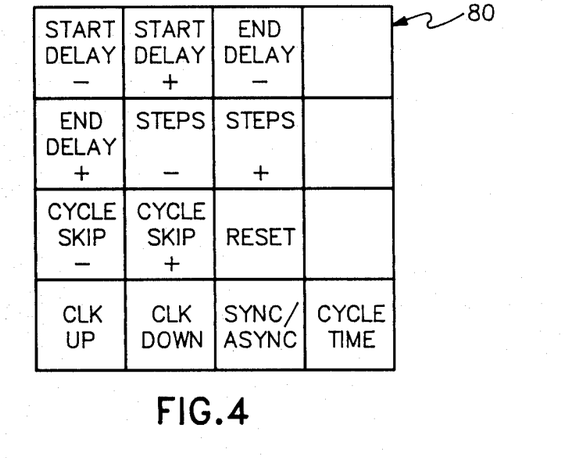
FIG. 4 is a top planar view of the operator interface of the motion analysis tool of the present invention.
Figure 5:
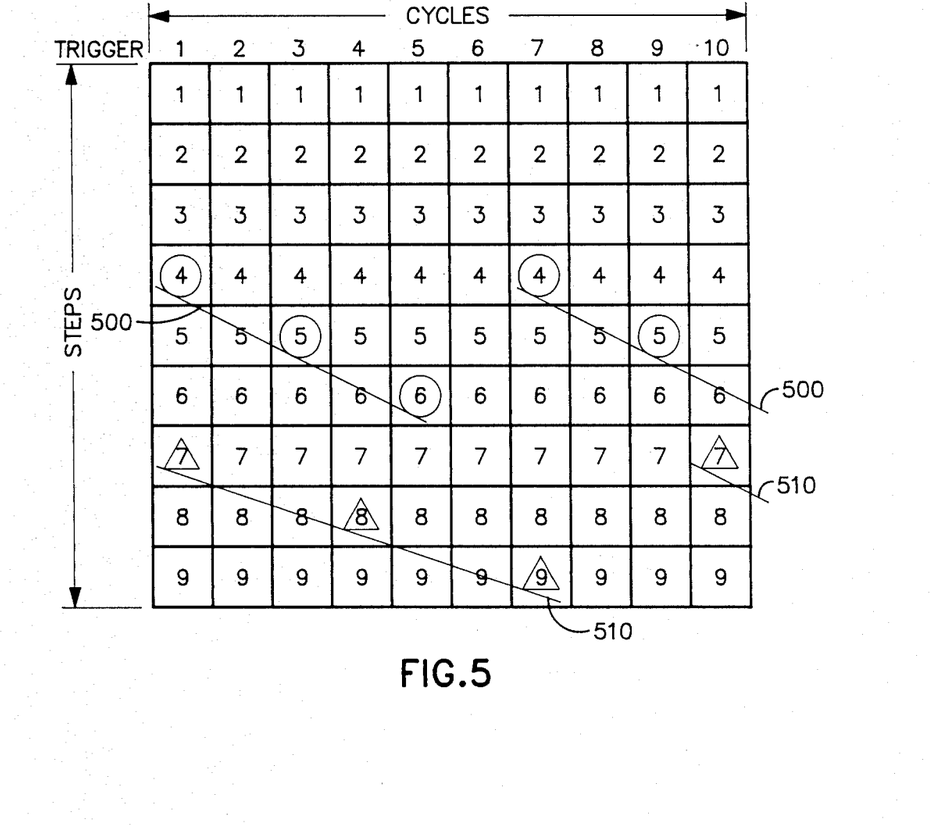
FIG. 5 sets forth the progressive cycles of the mechanical punch press of FIG. 2 illustrating additional modes of operation of the motion analysis tool of the present invention.

In FIG. 4, another feature of the present invention is shown which pertains to the CYCLE SKIP capability (PLUS and MINUS). For very high speed equipment, it may be necessary to skip cycles because the motion is so fast that the operator cannot view it or the camera 40 or strobe 56 is not ready to take another image. For example, assume it is desired to provide a viewing window encompassing the motion in steps 4, 5 and 6 of the machine of FIG. 2. START is set to three, END is set to six, and STEPS is set to one. Because of the high speed of the machine, SKIPS is set to two so that every other cycle is skipped as shown in FIG. 5 along line 500. Skipping every other cycle permits the image at circle 4 (step 4 in cycle 1) to be captured, the image at circle 5 (step 5 in cycle 3) to be captured, and the image at circle 6 (step 6 in cycle 5 to be captured), the capturing then repeats for circle 4 (step 4 in cycle 7), etc. In this example, the viewing window of three steps is viewed in slow motion over six complete cycles.

As another example, assume that steps 7, 8 and 9 are defined to be the viewing window and are selected to be viewed on every third cycle. This is illustrated by line 510 of FIG. 5. In this example, SKIP is set to three and the viewing window of three steps is viewed in slow motion over nine complete cycles. This significantly slows the motion down for analysis by the operator.

Under the preferred implementation, cycles that occur at a rate faster than 20 per second (1200 per minute) can be viewed by skipping to successive cycles. For example, in a repetitive situation such as a can transfer line, rates of 2400 cans per minute can be processed by looking at every other can, rates of 3600 cans per minute can be processed by looking at every third can, etc.

In summary, the motion analysis tool of the present invention responds to a trigger signal (externally or internally) corresponding to each repetition or cycle of the object. It then captures a video image of the object a predetermined delay of time (i.e., START DELAY) after the generation of the trigger signal for the first cycle. A predetermined step of time (i.e., STEPS) is then added to the predetermined delay (i.e., START DELAY) and a second video image of the object is captured during the next preselected cycle (i.e., CYCLE SKIP). This process repeats until the end of the series of captured images (i.e., END DELAY).

The operator interface 80 of the present implementation of the invention in FIG. 4 has two additional controls. The first control is CYCLE TIME and when activated, the speed of the equipment, as sensed by the controller 70 via the external trigger input 72, is shown as part of the setup information either in the setup monitor 90 or in the monitor 100. The cycle time simply displays the measured period as determined from the equipment control 32 of the line 34 or by the sensor circuit 64 over line 62 of FIG. 1.

The final control SYNC/ASYNC on the operator interface 80 permits the system of the present invention 10 to operate either in a synchronous or an asynchronous mode. In the synchronous mode, the external trigger input 72 is providing the necessary equipment sync signals to the controller 70 so that the operator views an image in monitor 100 in synchronism with the equipment 20. In the SYNC mode, the present implementation of the invention is capable of sampling 0-20 frames per second.

In the asynchronous mode, the controller 70 is not relying on signals over line 72 and indeed the trigger selection 60 is not required. An internal clock in the controller 70 can then be adjusted to slow down or speed up the controller 70 until it is in approximate sync with the equipment 20. However, if there are variations in the cyclic frequency of the piece of the equipment 20, the asynchronous mode may be difficult to match with the equipment 20 and therefore the image in monitor 100 may drift. In the ASYNC mode, the present implementation of the invention is capable of sampling 0.15-20 frames per second (i.e., a sample every 6.5 sec. to a sample every 50 msec). It is to be expressly understood that these are preferred values and that the present invention can be suitably modified to perform at other suitable values.

3. Detailed Discussion of System Components

With this general discussion in mind, the detailed operation of the system 10 of the present implementation will now be discussed.

In FIG. 1, the camera 40 is a conventional CCD array camera such as the commercially available Fairchild Industrial Camera with either a 70–150 mm Macro lens or a 35 mm lens. The Macro lens enables the operator to obtain close up images of the object as it moves. The camera delivers the RS170 video signal, either color or black and white, over a coaxial connection 44 to the frame grabber 90. The Fairchild camera also generates timing signals such as master clock (MC), vertical drive (VD), horizontal drive (HD), field index (FI), and composite blanking (CB). The timing signals are delivered over lines 46 from the camera 40 to the frame grabber 90.

The strobe head 50 and strobe 56 are conventional and the strobe head 50 is connected to a fiber optic cable 54. The strobe 56 is driven at a repetition rate controlled over line 74 by the frame grabber 90. In the preferred implementation, the strobe 56 is an MVS 2020/2200 series available from EG&G Electro-optics, 35 Congress Street, Salem, Mass. 01970.

The camera 40 and the strobe head 50 are each small and portable and are connected to lengthy cables 44, 46 and 54 such as, for example, 15 feet in length. Such small sizes and substantial lengths allow the camera and strobe to be mounted on tripods or the like and quickly positioned at the equipment 20. For more permanent installations, dedicated fixtures for holding the camera and the strobe could be placed on the equipment.

a. Frame Grabber Analog Portion (FIG. 6)

Figure 6:
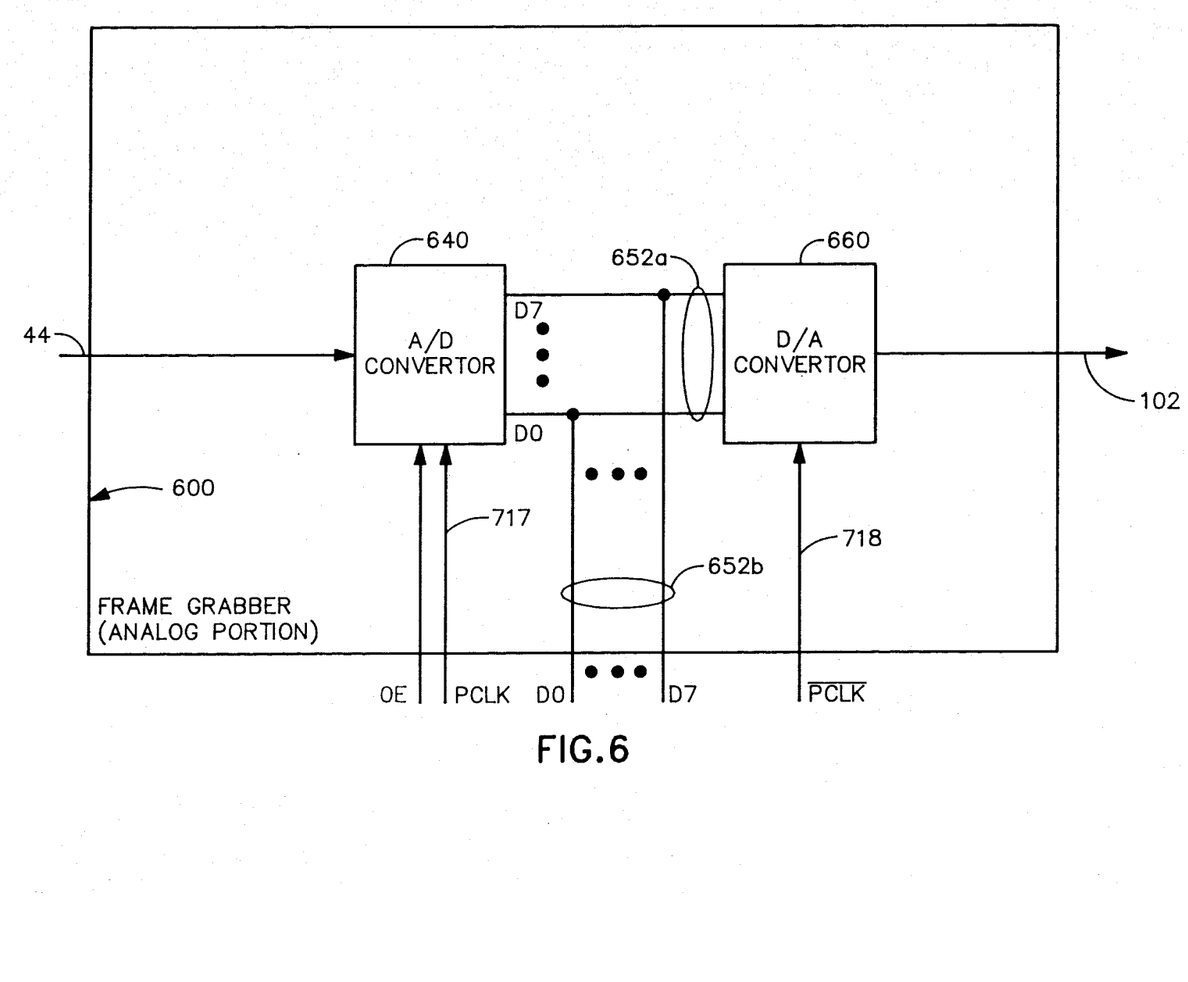
FIG. 6 is the block diagram setting forth the components of the analog portion of the frame grabber of the present invention.

In FIG. 6, the analog portion 600 of the frame grabber 90 is shown receiving the video input on coax 44 which is delivered into an A/D converter 640. The A/D convertor 640 is a conventional part available from Micro Power Systems, 3100 Alfred Street, Santa Clara, Calif. 95054 as Model MP7684. The analog signal delivered from the camera, 40 over line 44 is digitized by convertor 640 and the digital signals are placed on digital bus 652. Bus 652b is delivered to the digital frame grabber portion 700 (FIG. 7) and bus 652a is delivered into a digital to analog converter 660. In the preferred implementation, buses 652a and 652b are eight bit digital buses.

The D/A converter 660 is conventionally available as Model No. Bt106 from Brooktree Corporation, 9950 Barnes Canyon Road, San Diego, Calif. 92121. The video output signal from the D/A converter 660 is delivered over line 102 to the video monitor 100 and to the optional VCR 110. The analog portion 600 of the frame grabber 90 functions to receive video signals from the camera 40 and to deliver them into the digital portion 700 and into the monitor 100.

b. Frame Grabber Digital Portion (FIG. 7)

Figure 7:
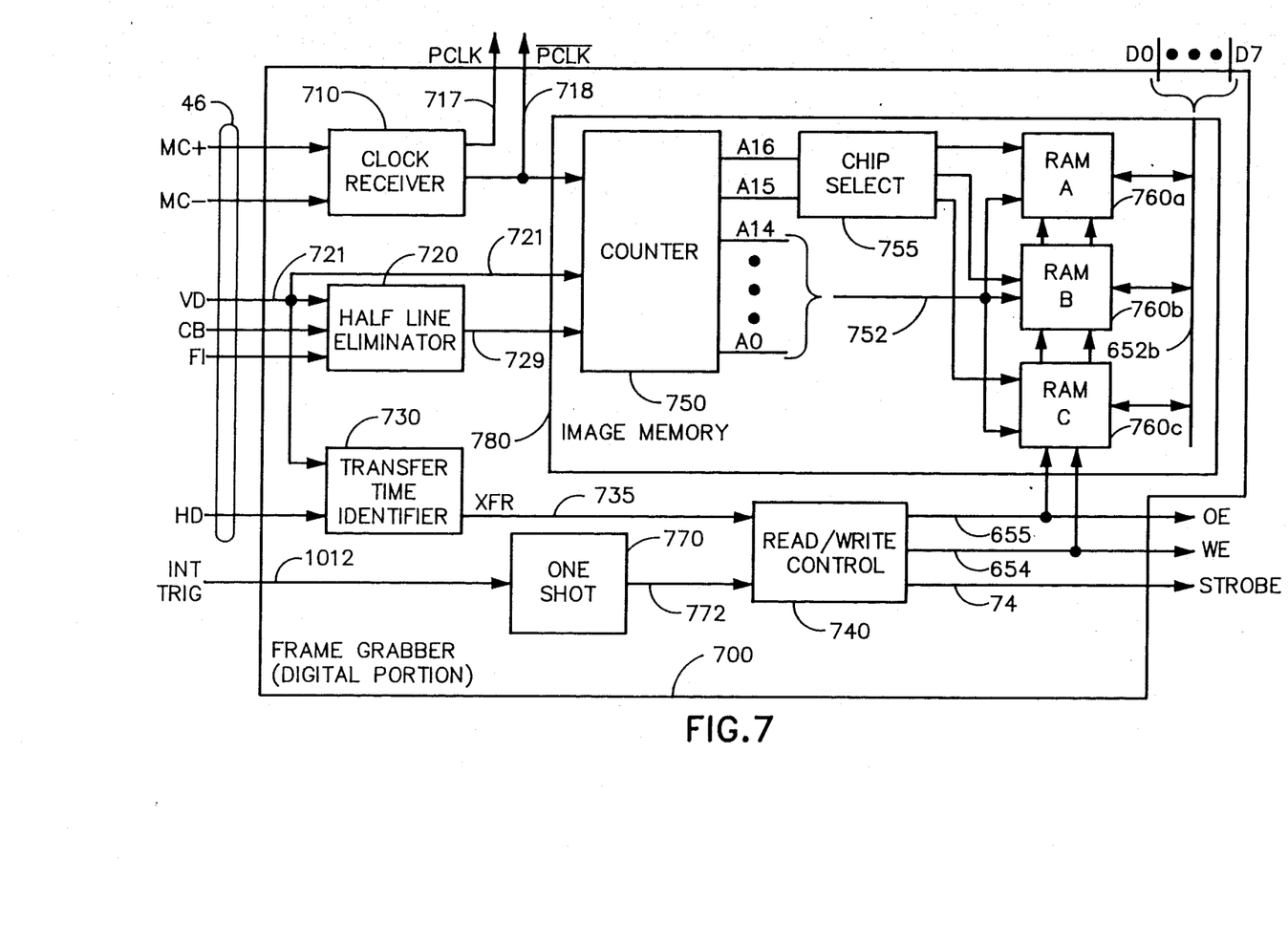
FIG. 7 is a block diagram of the digital portion of the frame grabber of the present invention.

FIG. 7 sets forth the details of the digital portion 700 of the frame grabber 90 of the present implementation. This portion 700 of the frame grabber 90 includes a clock receiver 710, a half line eliminator circuit 720, a transfer time identifier 730, a read/write control 740 and an image memory 780 which comprises a counter 750 and a memory 760. Each of these circuits will be discussed in the following.

The clock receiver 710 is interconnected to receive the master clock (MC+ and MC−) signals from the video camera 40 over lines 46. The clock receiver 710 receives a differential version of the master clock, buffers that version and divides it by two. The output of receiver 710 is the pixel clock (PCLK and NOT PCLK). The clock receiver 710 provides all of the video timing for the system of the present implementation. Both PCLK outputs are delivered over lines 717 and 718 into the frame grabber analog portion 600 as shown in FIG. 6. The PCLK output is delivered into the A/D converter 640 and provides the timing necessary to form the A/D conversion of the video signal on line 44. Likewise, the NOT PCLK signal on lead 718 is delivered to the digital/analog convertor 660 and causes the digital image signal on bus 652a to be converted into a video signal on lead 102 for delivery to the monitor 100.

The camera 40 has the ability to generate an interlaced or a non-interlaced video signal. The present implementation uses the non-interlaced video signal which decreases the resolution by one-half. The half-line eliminator circuit removes the halfline in the EVEN field mode of delivery. The half line eliminator receives the vertical drive (VD), the composite blanking (CB) and the field index (FI) signals to perform this elimination. The output of the half line eliminator which is delivered over line 729 is delivered to the counter 750 in the image memory 780. This output is termed a "modified composite blanking" signal (MCB).

Figure 8:
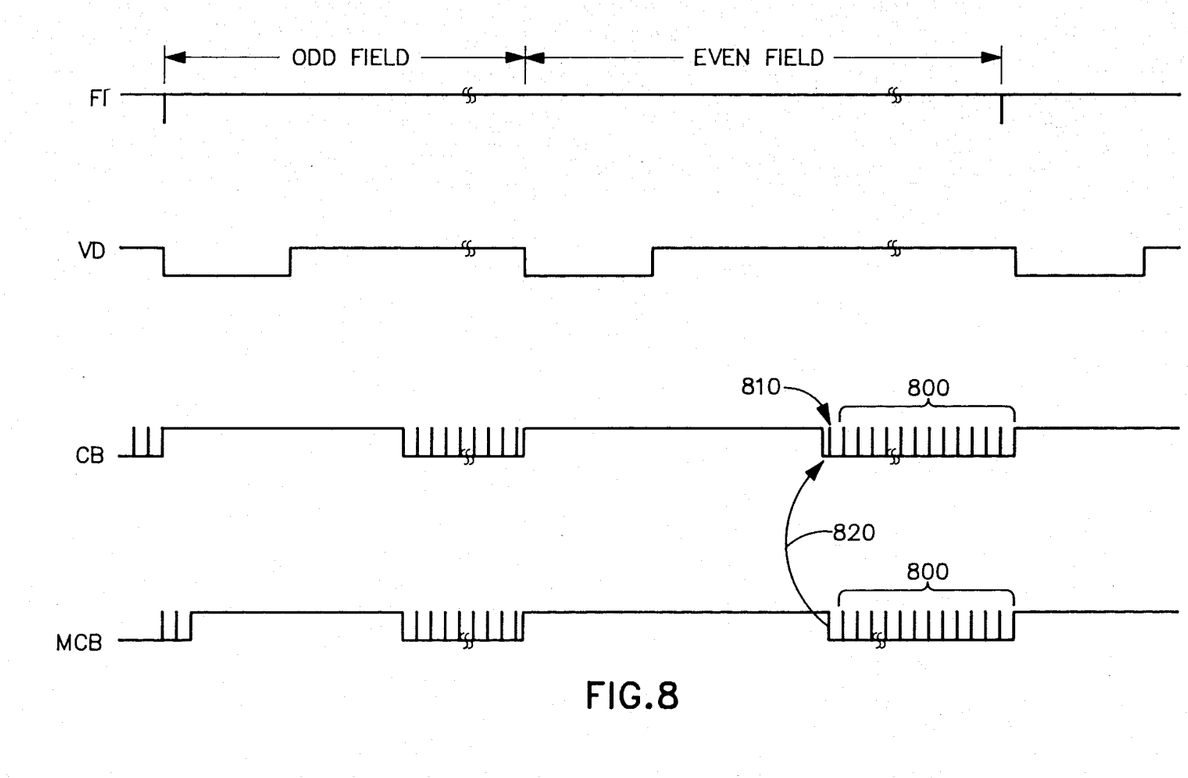
FIG. 8 sets forth the timing for the half line eliminator of the present invention.

The operation of the half-line eliminator circuit is shown in FIG. 8. The field index FI marks the start of the ODD field. The composite blanking (CB) shows the lines 800 and the presence of a half-line 810. The circuit 720 functions to eliminate the half-line 810 in the MCB output 729 as shown by line 820.

The transfer time identifier 730 is also dependent upon the timing signals from the camera 40 and receives the vertical drive signal (VD) and the horizontal drive (HD) signals over leads 46 from the camera 40. The output XFR is delivered on lead 735 to the read/write control circuit 740. These transfer signals generate the timing necessary to grab or capture a frame of the image and to store it within the system. This circuit 730 identifies the transfer time internal to the camera 40. As will be explained in more detail in FIG. 9, the motion analysis tool of the present embodiment cannot fire the strobe 56 when the camera 40 is doing an internal transfer of the active pixels to the read out section of the camera. If this were to occur, an unusable image would result.

The read/write control 740 in FIG. 7 receives the trigger signal on line 1012 from the controller 70 via one shot 770 over line 772 and outputs the strobe signal on line 74 to the strobe 56 and the output enable (OE) and the write enable (WE) signals on lines 654 and 655. The read/write control 740 also receives the XFR signal on line 735 from the identifier 730.

Figure 9:
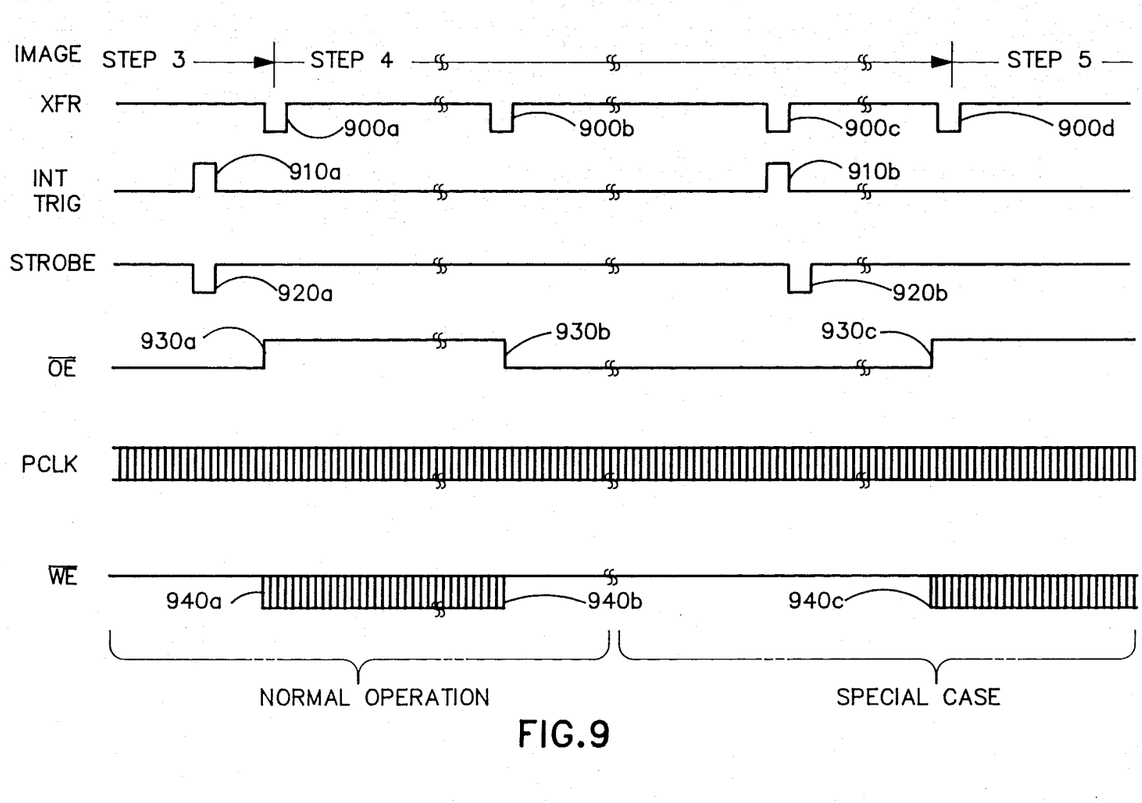
FIG. 9 sets forth the timing for the read/write control of the present invention.

In FIG. 9, the inputs and outputs of the read/write control 740 are set forth. The logical inversion of the XFR signal from identifier 735 is shown having downward pulses 900 on line 735. The internal trigger pulses 910 are delivered over line 772 from the one shot 770 and are shown as positive going pulses in FIG. 9. The transfer pulses 900 generated from camera 40 via transfer circuit 730 are asynchronous from the generation of the trigger signals 910.

During normal operation, the read/write control 740 outputs a strobe pulse 920a, when a trigger signal 910a is delivered. The strobe pulse 920a is delivered to strobe 56 and light 52 is produced. With the detection of the next transfer pulse 900a, the control 740 generates a positive going edge for the inversion of the output/enable (NOT OE) at point 930a and a negative going edge for the inversion of the write/enable (NOT WE) at point 940a. The activation of NOT OE at 930a and NOT WE at 940a commences the capturing of the image as lit by the strobe pulse 920a into the image memory 780. The next NOT XFR pulse 900b causes the capturing to stop and NOT OE and NOT WE fall at points 930b and 940b, respectively.

At this point, it is helpful to review which images appear in the monitor 100. Referring to FIG. 3 and the viewing window defined by line 300 (i.e., STEPS3-7), the image in the monitor 100 prior to the advent of internal trigger 910a is STEP3 as shown by the IMAGE line in FIG. 9. The advent of trigger 910a followed by the NOT XFR 900a causes the image memory 780 to commence storing the STEP4 image at time 940a and the monitor 100 to immediately display the STEP4 image. During normal operation this process would repeat from STEP to STEP.

Because the trigger signal on line 772 is asynchronous with the transfer signal on line 735, the two signals 910b and 900c may overlap in time as shown in FIG. 9 as the "Special Case." When this occurs, the strobe pulse 920b on line 74 is delayed and only issues with the lagging edge of the NOT XFR pulse 900c. When the next NOT XFR pulse 900d is sensed, the control 740 generates the NOT OE pulse at point 930c and the NOT WE pulse at point 940c. At this time in our example of window 300 of FIG. 3, the image for STEP5 would be viewed in monitored 100 and stored in memory 780.

The image memory 780 will now be discussed. The counter 750 is a conventional binary counter and counts the pixels from the clock receiver 710 and the line information on line 729 from the half-line eliminator 720. The most significant two bits of the output counter 750 are designated A15 and A16 and enter a chip select circuit 755 which decodes this information to select the memory chip which, in the preferred implementation, consists of three static RAMs 760a, 760b, and 760c. The selected RAM can then be separately addressed by address bits A0 through A14 which are delivered over bus 752 to the RAM 760. The counter 750, the chip select 755, and the RAM 760, along with OE 655, WE 654, and data bus 652b, function to capture or grab a digital representation of a video frame image of the equipment 20 as discussed above. Each RAM 760 is a static RAM chip capable of storing 32K bytes of information.

It is to be expressly understood that the circuitry shown in FIG. 7 is specific to the type of camera 40 being used in system 10 of the present implementation.

The circuit is specifically designed for the Fairchild camera. Other cameras could be used according to the teachings of the present implementation but the circuitry shown in FIG. 7 would be suitably configured to work with the timing signals delivered over lines 46 from the video camera to permit frame grabbing.

c. Controller 70 (FIG. 10)

Figure 10:
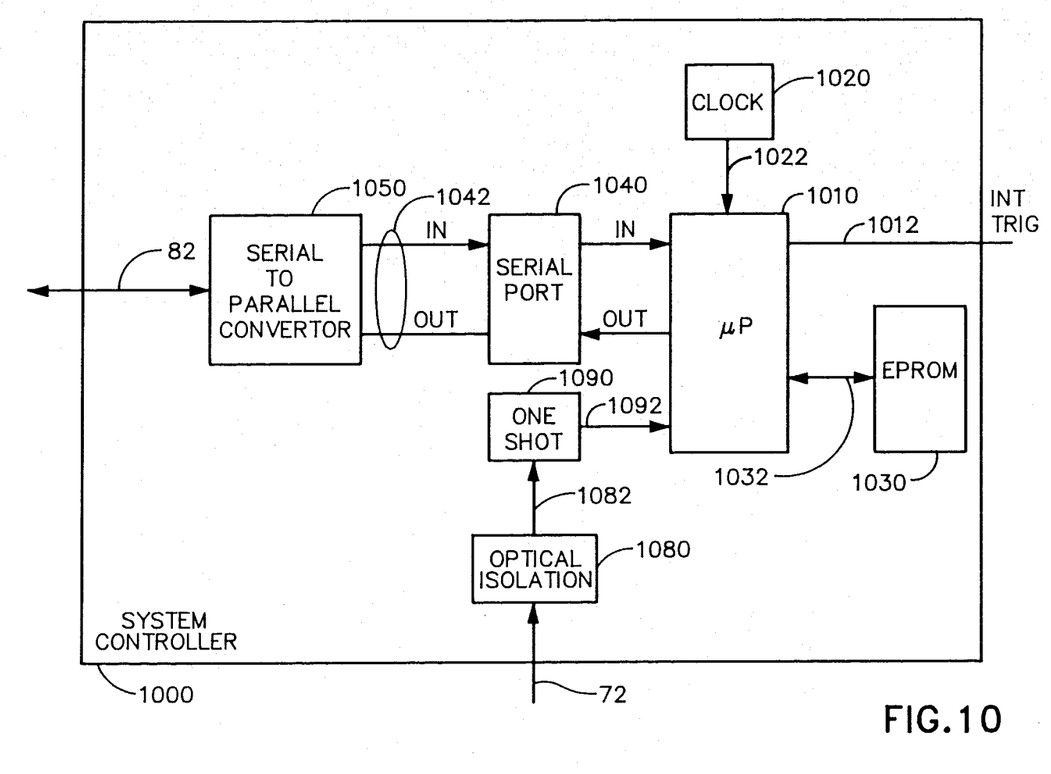
FIG. 10 is the block diagram setting forth the components of the system controller of the present invention.

In FIG. 10, the details of the controller 70 are set forth. The controller includes a microprocessor 1010 interconnected with a clock 1020 and an erasable programmable read only memory (EPROM) 1030. The clock 1020 is a ten Kilohertz precision clock and is connected to the microprocessor over line 1022. The EPROM is connected to the microprocessor over a bidirectional bus 1032. The microprocessor 1010 which in the preferred implementation is Model SAB80535 available from Siemens AG, Bereich Bauelemente, Balanstrabe 73, Postfach 801709, D-8000 Munchen 80, Federal Republic of Germany. The microprocessor 1010 communicates with the operator interface 80 and display 90 through a serial port 1040. The serial port 1040 communicates with a serial to parallel converter 1050 over a serial bus 1042. The serial to parallel converter is interconnected to the operator interface 80 over bus 82. The external trigger 60 is delivered to the trigger signal over line 72 into an isolation circuit 1080 such as an opto-isolator for delivery over line 1092 into the microprocessor 1010. The microprocessor 1010 delivers an internal trigger pulse over line 1012 to the one shot 770 of FIG. 7.

When the operator interface of FIG. 4 has the control SNYC/ASNYC set to SYNC, the microprocessor 1010 receives the external trigger pulse over line 72 and extends that signal over line 1012 to the read/write control 740 of FIG. 7. In this fashion, the microprocessor control 1000 configures the system of the present implementation to synchronize with the motion of the piece of equipment 20 being imaged. In the event the SYNC/ASYNC control is set to ASYNC, this state is sensed over line 82 by the microprocessor 10!0 via convertor 1050 and port 1040. This causes the microprocessor 1010 to ignore any external signals on line 1092 and to derive an internal synchronization signal logically based upon the clock 1020. This internal synchronization clock is then delivered over line 1012 to the read/write control 740. The operator of the system by adjusting the CLK UP and CLK DOWN controls (shown in FIG. 4) can vary the frequency of the internal trigger pulses on line 1012. The microprocessor 1010 conventionally responds to signals on the serial port 1040 from the controls to appropriately increase or decrease the frequency of the internal triggering pulse on line 1012 when the asynchronous mode of operation is selected in the operator interface 80.

The operator may also freeze the sampling at any point in the machine cycle by simply setting the START to the desired position as previously discussed. Sampling rates up to 20 samples per second can be interpreted on the video monitor 100. However, the system of the present implementation is capable of providing images up to a 60 frame per second rate in the ASYNC mode. At this rate, analysis must be made using the optional VCR 110.

The microprocessor 1010 is suitably programmed with the program resident in the EPROM 1030 to control the system of the present implementation as fully discussed herein. The microprocessor 1010 fully responds to the status of the controller in the operator interface 80. Likewise, the microprocessor 1010 through communication with the interface 80 can selectively display information in the display. For example, by activating the CYCLE TIME button in the operator interface 80, the microprocessor 1010 responds to the trigger signals 72 to display in interface 80 the repetitive cycle speed of the piece of equipment 20 being observed as sensed by the external trigger 60.

d. Physical Configuration

The system of the present implementation is designed to mount on a standard laboratory cart as shown in FIG. 1. The monitor 100, system controller 70, operator interface 80, video camera 40, strobe 56, and optional VCR 110 are further designed to be placed in ruggedized carrying cases which can be easily packed for airline travel. In comparison to the conventionally available Video Logic High Speed Camera System for motion analysis, the present implementation is less costly, smaller, and easier to ship. Table 1 shows a comparison of the present invention and the presently available Video Logic system.

TABLE I

|  | Video Logic | Motion Analysis Tool |
|---|---|---|
| Frame Speed | 60–300 HZ (16.7 to 3.3 ms) | .1–60 HZ (10000 to 16.7 ms) |
| Physical Size | 100+ Ft$^3$ | *1.5 to 5 Ft$^3$ |
| Number of Transportable Units | 8 | *1 or 2 cases |
| Recording Media | ¾" Professional Tape | Standard ½" VHS Tape |
| Monitor & Size | Monochrome 20" | Monochrome Any Size (14" as Tested) |
| Camera Size (Approx.) | ¾ Ft$^3$ | 20 In$^3$ |
| Trigger | Internal or Incident | Internal or Incident |
| Cost | $60K | $15 to $20K |

*Depends on whether it comes with a cart or not.

While preferred embodiments of the present invention have been shown, it is to be expressly understood that modifications and changes may be made thereto and that the present invention is set forth in the following claims.

We claim:

1. A motion analysis tool for viewing the repetitive motion of an object, said motion analysis tool comprising:
   means operatively connected with said object for generating a trigger signal corresponding to each repetition of said object,
   means directed at said object for producing video images of said object as said object moves through each said repetition of said motion,
   means directed at said object for selectively illuminating said object,
   means receptive of said trigger signals from said generating means for capturing a series of video images from said producing means, said capturing means activating said illuminating means to illuminate said object when capturing each video image in said series, each of said captured images in said series being spaced a predetermined step of time apart in said motion, and each successive captured image in said series being taken from the next or a subsequent successive repetition of said object, and means receptive of said series of captured images from said capturing means for displaying said series of images, said displayed images providing a slow motion simulation view of said object as said object moves in said repetitive motion.

2. The motion analysis tool of claim 1 further comprising means in said capturing means for setting when said series of images starts and ends in said repetition so that only the portion of said repetition corresponding to a viewing window is repeatedly displayed by said displaying means.

3. The motion analysis tool of claim 1 further comprising means in said capturing means for varying said predetermined time steps so that the resolution of said displayed image can be changed.

4. The motion analysis tool of claim 1 wherein said generating means comprises:
   means attached to said moving object for providing a position indication, and
   means attached near said moving object for generating said trigger when said providing means is at said position indication.

5. The motion analysis tool of claim 1 further comprising means receptive of said series of captured images from said capturing means for recording said series of images for playback.

6. The motion analysis tool of claim 1 wherein said producing means comprises a RS170 camera having a CCD array.

7. The motion analysis tool of claim 1 wherein said capturing means while capturing an image delivers the aforesaid image to said displaying means for display.

8. The motion analysis tool of claim 1 wherein said produced video images are in color.

9. The motion analysis tool of claim 1 wherein said produced video images have a frame speed of 60 Hz.

10. The motion analysis tool of claim 1 further comprising means connected to said capturing means for displaying set up information such as the repetition rate of said object and the value of said predetermined step of time.

11. The motion analysis tool of claim 10 wherein said displaying means comprises a monitor which displays said series of images and said set up information.

12. A motion analysis tool for viewing the repetitive motion of an object, said motion analysis tool comprising:
   a video camera directed at said object for producing video images of said object as said object moves through each said repetition of said motion,
   a strobe directed at said object for selectively illuminating said object,
   means connected to said video camera for capturing a series of video images from said camera, said capturing means activating said strobe to illuminate said object when capturing each video image in said series, each of said captured images in said series being spaced a predetermined step of time apart in said motion, and each successive captured image in said series being taken from the next or a subsequent successive repetition of said object,
   means in said capturing means for setting when said series of images starts and ends in said repetition so that only the portion of said repetition corresponding to a viewing window is repeatedly displayed by said displaying means,
   means in said capturing means for varying said predetermined time steps so that the resolution of said displayed images can be changed, and
   means receptive of said series of captured images from said capturing means for displaying said series of images, said displayed images providing a slow motion view of said object in said viewing window as said object moves in said repetitive motion.

13. The motion analysis tool of claim 12 wherein said producing means comprises a RS170 camera having a CCD array.

14. The motion analysis tool of claim 12 wherein said capturing means while capturing an image delivers the aforesaid image to said displaying means for display.

15. The motion analysis tool of claim 12 wherein said video camera produces color video images.

16. The motion analysis tool of claim 12 wherein said video camera has a frame speed by 60 Hz.

17. The motion analysis tool of claim 12 wherein said displaying means also displays set up parameters.

18. The motion analysis tool of claim 12 further comprising:
   means operatively connected with said object for generating a trigger signal corresponding to each repetition of said object, said capturing means being activated by said trigger signal to capture said series of video images.

19. The motion analysis tool of claim 18 wherein said generating means comprises means for providing an internal trigger signal, said providing means being selectively adjustable in a frequency range so that the frequency of repetition of said object can be matched to the frequency of said internal trigger signal.

20. The motion analysis tool of claim 18 wherein said generating means comprises:
   means attached to aid moving object for providing a position indication, and
   means attached near said moving object for generating said trigger when said providing means is at said position indication.

21. A motion analysis tool for viewing the repetitive motion of an object, said motion analysis tool comprising:
   means operatively connected with said object for generating a trigger signal corresponding to each repetition of said object,
   a RS170 video camera having a CCD array directed at said object for producing video images of said object as said object moves through each said repetition of said motion,
   a strobe directed at said object for selectively illuminating said object,
   means receptive of said trigger signals from said generating means and connected to said video camera for capturing a series of video images from said camera, said capturing means activating said strobe to illuminate said object when capturing each video image in said series, each of said captured images in said series being spaced a predetermined step of time apart in said motion, and each successive captured image in said series being taken from a next predetermined successive repetition of said object,
   an operator interface connected to said capturing means having a DELAY input for setting when said series of images starts from the receipt of said trigger signal and ends from the receipt of said trigger signal so that only the portion of said repetition corresponding to a viewing window is repeatedly displayed by said displaying means, said operator interface having a STEPS input varying said predetermined time steps so that the resolution of said displayed images can be changed, and said operator interface having a SKIP input for determining which successive repetition of said object the next successive captured image in said series should be taken from, and a monitor receptive of said series of captured images from said capturing means for displaying said series of images, said capturing means while capturing an image delivering the aforesaid image to said display means for display, said displayed images providing a slow motion view of said object in said viewing window as said object moves in said repetitive motion.

22. A motion analysis tool for viewing the repetitive motion of an object, said motion analysis tool comprising:
- a RS170 video camera having a CCD array directed at said object for producing video images of said object as said object moves through each said repetition of said motion,
- a strobe directed at said object for selectively illuminating said object,
- means connected to said video camera for capturing a series of video images from said camera, said capturing means activating said strobe to illuminate said object when capturing each video image in said series, each of said captured images in said series being spaced a predetermined step of time apart in said motion, and each successive captured image in said series being taken from a next predetermined successive repetition of said object,
- a monitor receptive of said series of captured images from said capturing means for displaying said series of images, said capturing means while capturing an image delivering the aforesaid image to said display means for display, said displayed images providing a slow motion view of said object in said viewing window as said object moves in said repetitive motion.

23. A portable motion analysis tool for viewing the repetitive motion of an object, said motion analysis tool comprising:
- a first movable support,
- means mounted on said first movable support and located near said object for producing video images of said object as said object moves through each said repetition of said motion,
- a second movable support,
- means mounted on said second movable support and located near said object for selectively illuminating said object, and
- a movable cart, said cart carrying:
  (a) means connected to said video producing means for capturing a series of video images, said capturing means activating said illuminating means to illuminate said object when capturing each video image in said series, each of said captured images in said series being spaced a predetermined step of time apart in said motion, and each successive captured image in said series being taken from a next predetermined successive repetition of said object, and
  (b) a monitor receptive of said series of captured images form said capturing means for displaying said series of images, said capturing means while capturing an image delivering the aforesaid image to said display means for display said displayed images providing a slow motion view of said object in said viewing window as said object moves in said repetitive motion.

24. The portable motion analysis tool of claim 23 wherein said illuminating means comprises a strobe head mounted to said second movable support and a fiber optic cable, said cart further carrying a strobe connected to said capturing means and further interconnected over said cable with said strobe head.

25. The portable motion analysis tool of claim 23 wherein said cart further carries:
- an operator interface connected to said capturing means having a first input for setting when said series of images starts and ends so that only the portion of said repetition corresponding to a viewing window is repeatedly displayed by said displaying means, said operator interface having a second input for varying said predetermined time steps so that the resolution of said displayed images can be changed, and said operator interface having a third input for determining which successive repetition of said object the next successive captured image in said series should be taken from.

26. A method for viewing the repetitive motion of an object, said method comprising the steps of:
(a) generating a trigger signal corresponding to each repetition of the object,
(b) capturing a video image of said object a predetermined delay of time after generation of the trigger signal during a first repetition of the motion,
(c) adding a predetermined step of time to the aforesaid predetermined time delay,
(d) repeating steps (a), (b) and (c) for preselected successive repetitions of the object for a predetermined total number of repetitions to provide a series of captured images wherein each captured image from successive repetitions of the motion of the object is advanced in time by the predetermined step of time, and
(e) displaying said series of captured images wherein the displayed captured images provide a slow motion view of said object as said object moves in the repetitive motion.

27. A method for viewing the repetitive motion of an object, said method comprising the steps of:
(a) generating a trigger signal corresponding to each repetition of the object,
(b) setting the start and end positions in a viewing window of said motion,
(c) setting the number of viewing steps between the start time and the end time according to $$T_d = (T_{end} - T_{start})/n$$

where $T_d$ = the differential time between viewing steps and n = the number of steps between the start time, $T_{start}$, and the end time, $T_{end}$,
(d) capturing a video image of said object at the start time, $T_{start}$, after generation of the trigger signal during a first repetition of the motion,
(e) adding the differential time, $T_d$, to the aforesaid predetermined time delay,
(f) repeating steps (d) and (e) for preselected successive repetitions of the object until the video image at the end time, $T_{end}$, is captured to provide a series of captured images wherein each captured image from successive repetitions of the motion of the object is advanced in time by the differential time, $T_d$, and (g) displaying said series of captured images wherein the displayed captured images provide a slow motion view of said object as said object moves in the repetitive motion.

28. The method of claim 27 wherein the step of displaying said series of captured images also includes the displaying of set up information.

* * * * *